United States Patent
Lunsford et al.

(10) Patent No.: US 10,761,906 B2
(45) Date of Patent: Sep. 1, 2020

(54) MULTI-DEVICE COLLABORATION

(71) Applicant: Hewlett-Packard Development Company, L.P., Houston, TX (US)

(72) Inventors: Eric Michael Lunsford, Sunnyvale, CA (US); Donald Gonzalez, Redwood City, CA (US); Lawrence Williams, Taipei (TW); Yuan-Yang Huang, Taipei (TW); Tian-Yan Huang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 480 days.

(21) Appl. No.: 15/506,628

(22) PCT Filed: Aug. 29, 2014

(86) PCT No.: PCT/US2014/053319
§ 371 (c)(1),
(2) Date: Feb. 24, 2017

(87) PCT Pub. No.: WO2016/032501
PCT Pub. Date: Mar. 3, 2016

(65) Prior Publication Data
US 2017/0293506 A1    Oct. 12, 2017

(51) Int. Cl.
*G06F 9/54* (2006.01)
*H04L 29/06* (2006.01)
(Continued)

(52) U.S. Cl.
CPC .............. *G06F 9/54* (2013.01); *G06F 3/0488* (2013.01); *G06F 3/1423* (2013.01); *H04L 67/10* (2013.01);
(Continued)

(58) Field of Classification Search
CPC ........ G06F 9/54; G06F 3/0488; G06F 3/1423; G06F 3/1446; G06F 3/048; H04L 67/141;
(Continued)

(56) References Cited

U.S. PATENT DOCUMENTS

| | | |
|---|---|---|
| 6,710,770 B2 | 3/2004 | Tomasi et al. |
| 7,599,561 B2 | 10/2009 | Wilson et al. |

(Continued)

FOREIGN PATENT DOCUMENTS

| | | |
|---|---|---|
| CN | 2662407 Y | 12/2004 |
| CN | 202887066 U | 4/2013 |

OTHER PUBLICATIONS

"A Touch of Musical Class: Apple's Logic Pro X Update Brings the iPad into Play," Tech/Gadgets, The Malay Mail Online, Jul. 7, 2013, pp. 1-2.

(Continued)

*Primary Examiner* — Soe Hlaing
(74) *Attorney, Agent, or Firm* — HP Inc. Patent Department

(57) ABSTRACT

Examples relate to multi-device collaboration. The examples disclosed herein enable identifying, by a first computing device having a first processor, a first role to be played by the first computing device when the first computing device is connected with a second computing device having a second processor. The second computing device may play a second role when the second computing device is connected with the first computing device. The examples further enable determining, by the first computing device, when at least one predetermined triggering event occurs that causes the first role and second role to be switched such that the first role is played by the second computing device and the second role is played by the first computing device.

19 Claims, 9 Drawing Sheets

(51) Int. Cl.
*H04L 29/08* (2006.01)
*G06F 3/14* (2006.01)
*G06F 3/0488* (2013.01)
*G06F 3/048* (2013.01)

(52) U.S. Cl.
CPC ............ H04L 67/14 (2013.01); H04L 67/141 (2013.01); H04L 67/38 (2013.01); *G06F 3/048* (2013.01); *G06F 3/1446* (2013.01); *G09G 2300/026* (2013.01); *G09G 2360/04* (2013.01); *G09G 2380/14* (2013.01)

(58) Field of Classification Search
CPC ......... H04L 67/10; H04L 67/38; H04L 67/14; G09G 2380/14; G09G 2300/026; G09G 2360/04
See application file for complete search history.

(56) References Cited

U.S. PATENT DOCUMENTS

| | | | |
|---|---|---|---|
| 7,710,391 B2 | 5/2010 | Bell et al. | |
| 8,121,640 B2 | 2/2012 | Russ et al. | |
| 8,199,117 B2 | 6/2012 | Izadi et al. | |
| 8,736,583 B2 | 5/2014 | Anderson et al. | |
| 9,082,380 B1 * | 7/2015 | Hamilton | G10H 1/368 |
| 2001/0054986 A1 | 12/2001 | Leman | |
| 2005/0078092 A1 | 4/2005 | Clapper | |
| 2005/0114825 A1 | 5/2005 | Leung et al. | |
| 2005/0168399 A1 | 8/2005 | Palmquist | |
| 2007/0182663 A1 | 8/2007 | Biech | |
| 2007/0223476 A1 * | 9/2007 | Fry | H04L 29/12254 370/392 |
| 2008/0018591 A1 | 1/2008 | Pittel et al. | |
| 2008/0141259 A1 * | 6/2008 | Tjia | G06F 9/5044 718/104 |
| 2010/0195539 A1 * | 8/2010 | Tian | H04L 47/824 370/255 |
| 2011/0090155 A1 | 4/2011 | Caskey et al. | |
| 2011/0100198 A1 | 5/2011 | Gatzsche et al. | |
| 2011/0242054 A1 | 10/2011 | Tsu | |
| 2013/0077236 A1 | 3/2013 | Becze et al. | |
| 2013/0215041 A1 | 8/2013 | Kim et al. | |
| 2013/0244215 A1 | 9/2013 | Ho | |
| 2013/0285882 A1 | 10/2013 | Jiang et al. | |
| 2013/0327200 A1 | 12/2013 | Pogoda | |
| 2014/0104139 A1 * | 4/2014 | Buchner | G06F 3/1438 345/1.3 |
| 2014/0129235 A1 * | 5/2014 | Suvanto | G10L 15/22 704/276 |
| 2014/0137020 A1 | 5/2014 | Sharma et al. | |
| 2014/0218266 A1 | 8/2014 | Chen et al. | |
| 2014/0365580 A1 * | 12/2014 | Azenkot | H04L 65/403 709/205 |

OTHER PUBLICATIONS

Shahram Izadi et al., "C-Slate: A Multi-Touch and Object Recognition System for Remote Collaboration using Horizontal Surfaces," pp. 3-10, IEEE.

Slash Gear, "Behold a Multi-Touchsoreeh Tablet with Removable Hard Drives, A Smartphone, and A Tablet," May 6, 2011, pp. 1-9.

* cited by examiner

MULTI-DEVICE COLLABORATION

BACKGROUND

Recently, portable computing devices such as tablet computers and Smartphones have grown in popularity. Advancements in technology have increased portability of such devices by making them smaller, thinner, and lighter, providing a great advantage over traditional notebook computers. However, such portable devices may trade-off the hardware capability and display size in return for increased portability.

BRIEF DESCRIPTION OF THE DRAWINGS

The following detailed description references the drawings, wherein.

DETAILED DESCRIPTION

Figure 1:
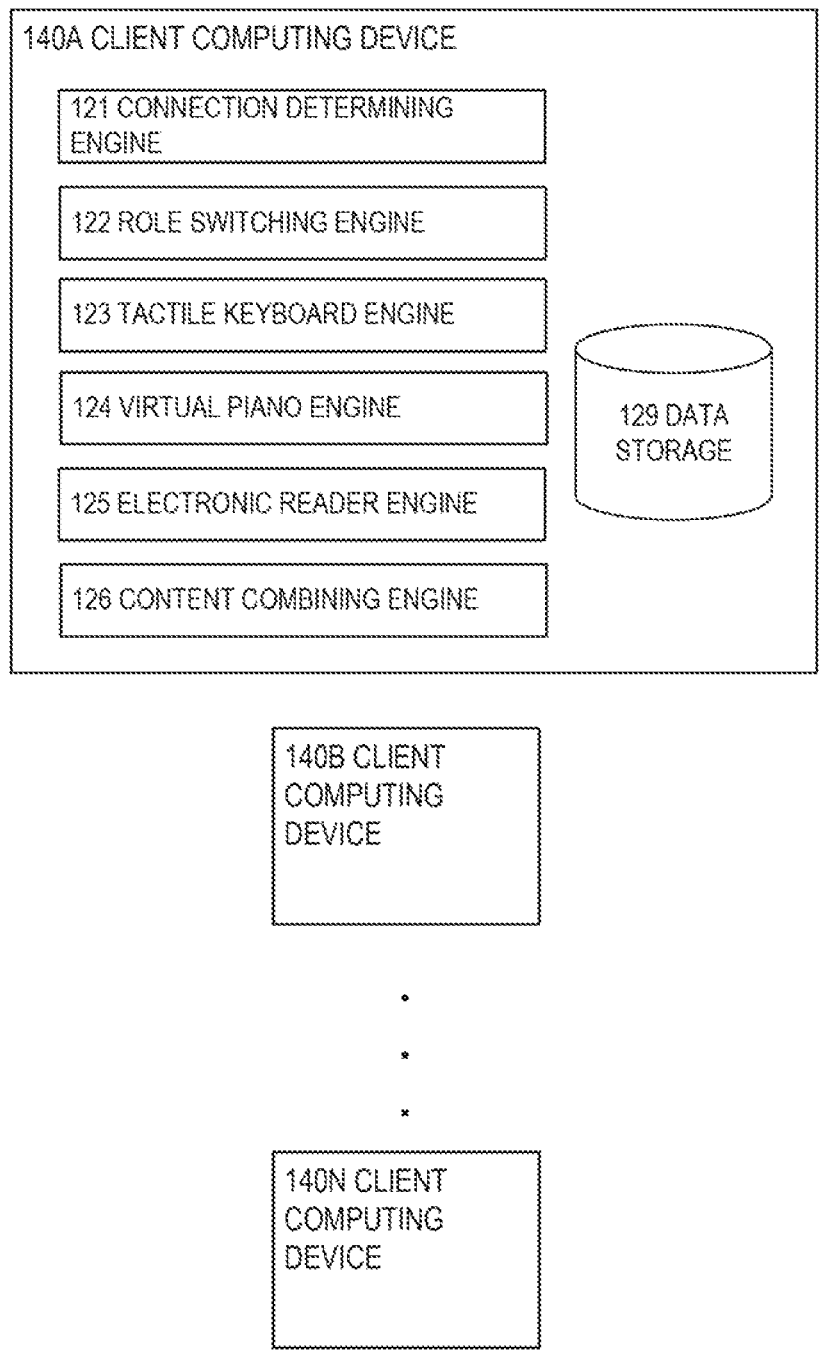
FIG. 1 is a block diagram depicting an example system comprising multiple client computing devices that are connected within a multi-device collaborating environment.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Recently, portable computing devices such as tablet computers and Smartphones have grown in popularity. Advancements in technology have increased portability of such devices by making them smaller, thinner, and lighter, providing a great advantage over traditional notebook computers. However, such portable devices may trade-off the hardware capability and display size in return for increased portability. While content can be shared among multiple portable devices to build a more collaborative environment, this still fails to maximize the use of the combined hardware resources and displays of the multiple portable devices in collaboration.

Examples disclosed herein relate to facilitating multi-device collaboration. In particular, the disclosed examples relate to establishing a multi-device collaborating environment by connecting at least two devices via a connection interface. An individual device in the multi-device collaboration environment may be associated with a particular role to be played by that device. For example, the role associated with individual computing devices may comprise a keyboard, a tactile keyboard, a virtual piano keyboard, a game controller, a drawing pad, and/or a display of content. The disclosed examples further relate to determining when at least one predetermined triggering event occurs that causes the roles associated with different computing devices in the multi-device collaboration to be switched. For example, the at least one predetermined triggering event may comprise a user input, an orientation change (e.g., position change) of at least one of the computing devices in the multi-device collaborating environment, and/or other triggering events.

FIG. 1 is a block diagram depicting an example system 100 comprising multiple client computing devices that are connected within a multi-device collaborating environment.

System 100 may include various components including client computing devices 140 (illustrated as 140A, 140B, . . . , 140N). Client computing devices 140 may include any type of computing device providing a user interface through which a user can interact with a software application. For example, client computing devices 140 may include a laptop computing device, a desktop computing device, an all-in-one computing device, a tablet computing device, a mobile phone (e.g., Smartphone), an electronic book reader, a network-enabled appliance such as a "Smart" television, and/or other electronic device suitable for displaying a user interface and processing user interactions with the displayed interface.

According to various implementations, system 100 and the various components described herein may be implemented in hardware and/or programming that configures hardware. Furthermore, in FIG. 1 and other Figures described herein, different numbers of components or entities than depicted may be used.

As detailed below, client computing device 140 may comprise a connection determining engine 121, a role switching engine 122, a tactile keyboard engine 123, a virtual piano engine 124, an electronic reader engine 125, a content combining engine 126, and/or other engines. The term "engine", as used herein, refers to a combination of hardware and programming that performs a designated function. As is illustrated respect to FIG. 2, the hardware of each engine, for example, may include one or both of a processor and a machine-readable storage medium, while the programming is instructions or code stored on the machine-readable storage medium and executable by the processor to perform the designated function.

Connection determining engine 121 may determine when a first computing device (e.g., a first tablet computing device) is connected and/or attached to a second computing device (e.g., a second tablet computing device). The connection and/or attachment may be made through at least one connection interface that may facilitate communication between two or more computing devices. The two or more computing devices may communicate using a defined protocol. In one example, the connection interface may comprise an external connection adapter that may be placed between the two or more computing devices. In another example, at least one of the two or more computing devices may include the connection interface that includes an input for receiving outputs of the other computing devices and/or an output for sending data to the other computing devices. The connection interface may comprise wired and/or wireless interface. The two or more computing devices that are attached and/or connected via the connection interface may be referred to herein as a multi-device collaboration environment. A computing device may be detached and/or disconnected from the multi-device collaboration environment based on the state of connection (e.g., the connection being lost, physically disconnected, etc.) and/or a user input (e.g., a user of the computing device configures the device to be disconnected).

In some implementations, when the first computing device determines that it is attached and/or connected to the second computing device, connection determining engine 121 may identify and/or determine a role to be played by the first computing device. The role may be identified and/or determined automatically by connection determining engine 121 and/or based on a user input.

In one example, connection determining engine 121 may generate a prompt for requesting a user to select a role (e.g., a first role) for the first computing device. The prompt may be displayed via a display of the first computing device. The role may be selected from a group of different roles that the first computing device may be capable of playing in a multi-device collaboration environment. For example, the role may comprise at least one of a keyboard, a tactile keyboard, a virtual piano keyboard, a game controller, a drawing pad, a display of content, and/or other roles. Once selected, the selected role may be associated with the first computing device. The association between the first role and the first computing device may be stored in a data storage 129 coupled to the first computing device and/or coupled to at least one computing device in the multi-device collaboration environment, and/or other databases. In some instances, the user may specify a role (e.g., a second role) for the second computing device using the first computing device. In other instances, the prompt may be generated and provided to a user via the second computing device. The role selected for the second computing device may be associated with the second computing device. The association between the second role and the second computing device may be stored in data storage 129 coupled to the second computing device and/or coupled to at least one computing device in the multi-device collaboration environment, and/or other databases.

The stored associations may be used to identify and/or determine the role for a particular computing device even after the particular computing device is disconnected from the multi-device collaboration environment and re-connected to the multi-device collaboration environment. Note that a particular computing device may have a first role when connected to a first multi-device collaboration environment (e.g., including computing device A, B, and C) and have a second role that is different from the first role when connected to a second multi-device collaboration environment (e.g., including computing devices, A, C, and D).

Once the role is associated with a particular computing device, the computing device may operate in accordance with the associated role when connected with the multi-device collaboration environment. For example, the first computing device may execute a first set of tasks associated with the first role (e.g., virtual piano keyboard) and the second computing device may execute a second set of tasks associated with the second role (e.g., a display of music scores) when the first and second computing devices are connected to one another. The two devices may work in synchronization in the multi-device collaboration environment such that a user can play the piano by using the virtual piano keyboard via the first computing device while the second computing device displays the music score, highlights the notes that the user just played, and/or generates an alert when the user plays an incorrect note, for example.

Role switching engine 122 may determine when at least one predetermined triggering event occurs that causes the roles associated with different computing devices in the multi-device collaborating environment to be switched. For example, the first role associated with the first computing device and the second role associated with the second computing device may be switched off based on the occurrence of at least one predetermined triggering event such that the first role is played by the second computing device and the second role is played by the first computing device. The at least one triggering event may comprise a user input, an orientation change (e.g., position change) of at least one of the computing devices in the multi-device collaboration environment, and/or other triggering events. Role switching engine 122 may detect an orientation change in at least one of the computing devices in the multi-device collaboration environment.

Continuing with the above example, the user may be playing the virtual piano using the first computing device that may be placed horizontally on a table by following the music scores displayed via the second computing device that may stand substantially perpendicular to the first computing device. The user may then flip the two devices around such that the second computing device may be placed horizontally on the table and the first computing device may stand substantially perpendicular to the second computing device. In this case, role switching engine 112 may detect the orientation change has occurred. In response to the detected orientation change, role switching engine 122 may switch the roles associated with the first and second computing devices. For example, based on the detected orientation change, the first computing device may operate in accordance with the second role (e.g., a display of music scores) whereas the second computing device may operate in accordance with the first role (e.g., virtual piano keyboard). The associations stored in database 129 may be updated based on the switch of the roles.

In some implementations, the orientation change may be detected based on comparing the present orientation or position to the previous orientation or position. If the change is equal or greater than a predetermined threshold, role switching engine 122 may determine that the orientation change has been detected and/or switch the roles between at least two computing devices in the multi-device collaborating environment.

When the role of a tactile keyboard is associated with a particular computing device, tactile keyboard engine 123 may protrude at least one of keyboard keys upwardly from the tactile keyboard when connected within the multi-device collaboration environment. The at least one of keyboard keys may be recessed downwardly when the computing device is disconnected from other devices in the multi-device collaboration environment.

When the role of a virtual piano keyboard is associated with a particular computing device, virtual piano engine 124 may display a virtual piano keyboard via a touch-screen display coupled to the computing device. The user may play the virtual piano by touching the notes on the touch-screen display. In some implementations, the virtual piano computing device may work with at least one other computing device in synchronization in the multi-device collaboration environment. For example, a user can play the piano by using the virtual piano keyboard via the first computing device while the second computing device displays the music score.

Virtual piano engine 124 may "run" the music score displayed on the second computing device as the user plays the piano using the first computing device. The notes that are being played may be highlighted. When the user nears the end of the last notes of the music score that is being displayed via the second computing device, the next page of the music score may automatically appear on the display. Virtual piano engine 124 may determine when the user plays an incorrect note on the virtual piano keyboard based on the music score. In response to determining that the user played the incorrect note, virtual piano engine 124 may provide graphical, audio, and/or tactile feedback to the user such that the user may be aware that the user has played the incorrect note. Information related to the incorrect notes may be stored in database 129.

Figure 6:
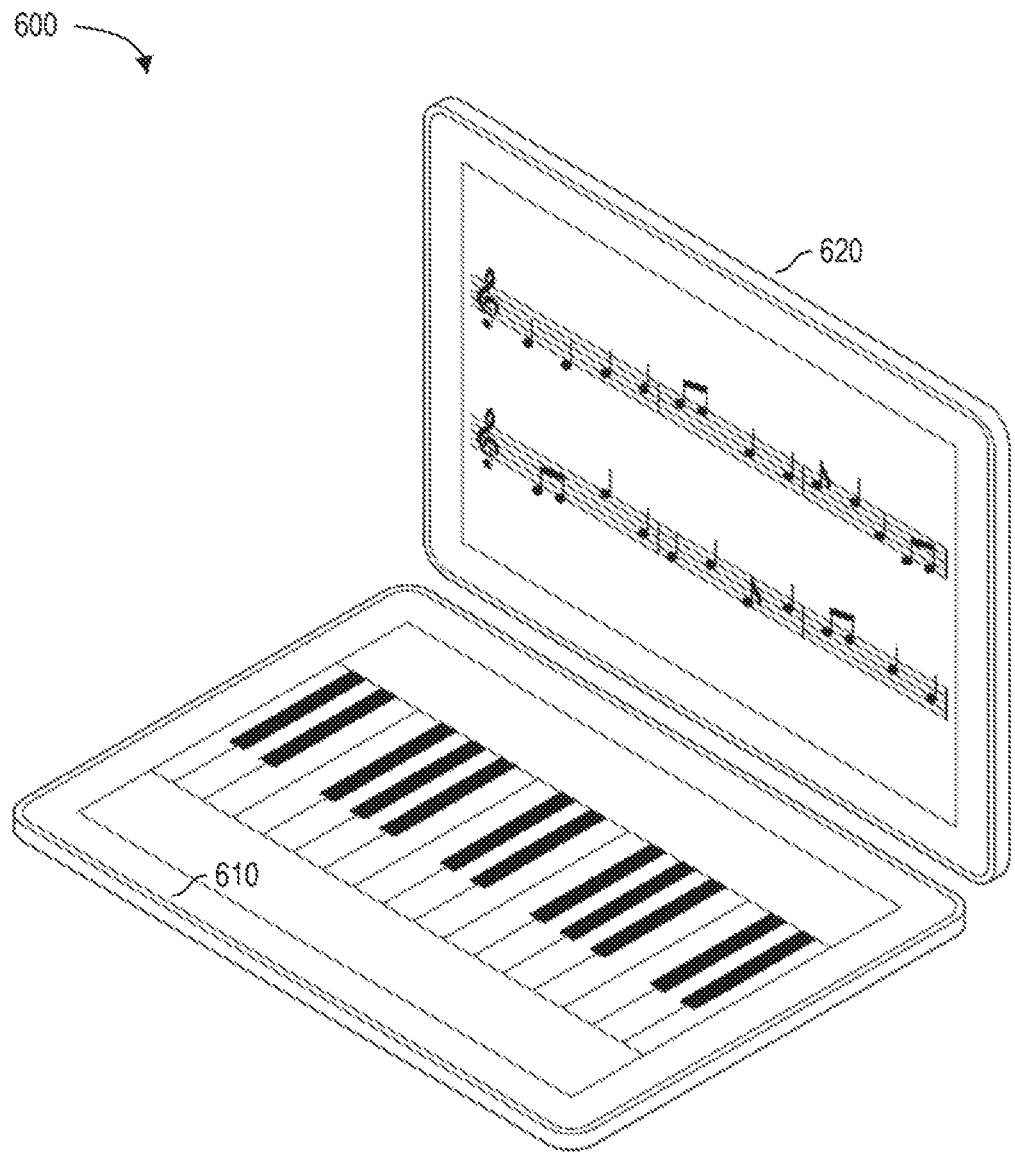
FIG. 6 is a diagram depicting an example multi-device collaborating environment comprising a client computing device that is associated with a virtual piano keyboard role.
Figure 7:
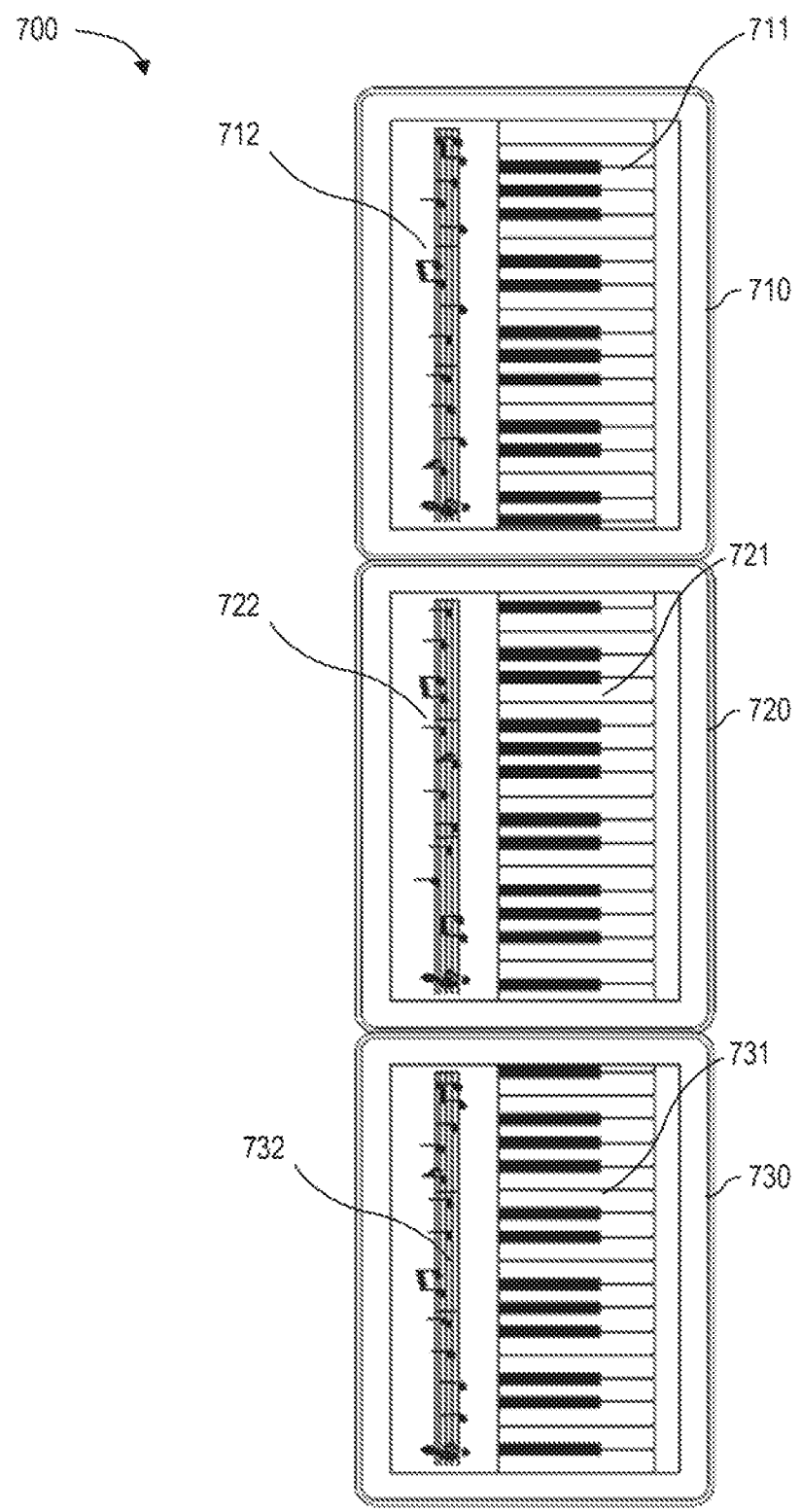
FIG. 7 is a diagram depicting an example multi-device collaborating environment comprising client computing devices that display different portions of a virtual piano keyboard.

In some implementations, two or more computing devices may display different portions of the virtual piano keyboard. For example, the first computing device may display a first portion of the virtual piano keyboard, the second computing device may display a second portion of the virtual piano keyboard, the third computing device may display a third portion of the virtual piano keyboard, and so on. In this way, the user may be able to play on a larger size piano keyboard that may be displayed via more than one computing device. Similarly, the music score may be displayed through multiple devices. For example, the first computing device may display a first portion of the music score, the second computing device may display a second portion of the music score, the third computing device may display a third portion of the music score, and so on. Example illustrations describing the functionalities of virtual piano engine 124 are shown in FIGS. 6-7.

Electronic reader engine 125 may cause a display of first content on the first computing device and/or cause the display of second content that may be related to at least a portion of the first content on the second computing device. The first and second content may comprise text, image, videos, audios, and/or other content. This may, for example, allow users to read text on one screen at the same time that they view related images and/or videos on another screen. Electronic reader engine 125 may determine when the user reaches the at least a portion of the first content that has related content (e.g., second content). This determination may be made based on user input (e.g., the user turns the page to move to the next page, the user highlights a particular word, etc.), eye-tracking software that may be able to determine what part of the first content the user is looking at, and/or other ways. Upon determining that the user may have reached the at least one portion of the first content, electronic reader engine 125 may display the related content (e.g., second content) on the second computing device. For example, when the user highlights a particular word of the first content, the dictionary meaning of the word may be displayed via the second computing device.

The second content may remain visible until electronic reader engine 125 determines that the second content is no longer relevant and/or third content needs to replace the second content. This determination may be made based on user input (e.g., the user turns the page to move to the next page of the first content), eye-tracking software that may be able to determine what part of the first content the user is looking at, and/or other ways.

Figure 8:
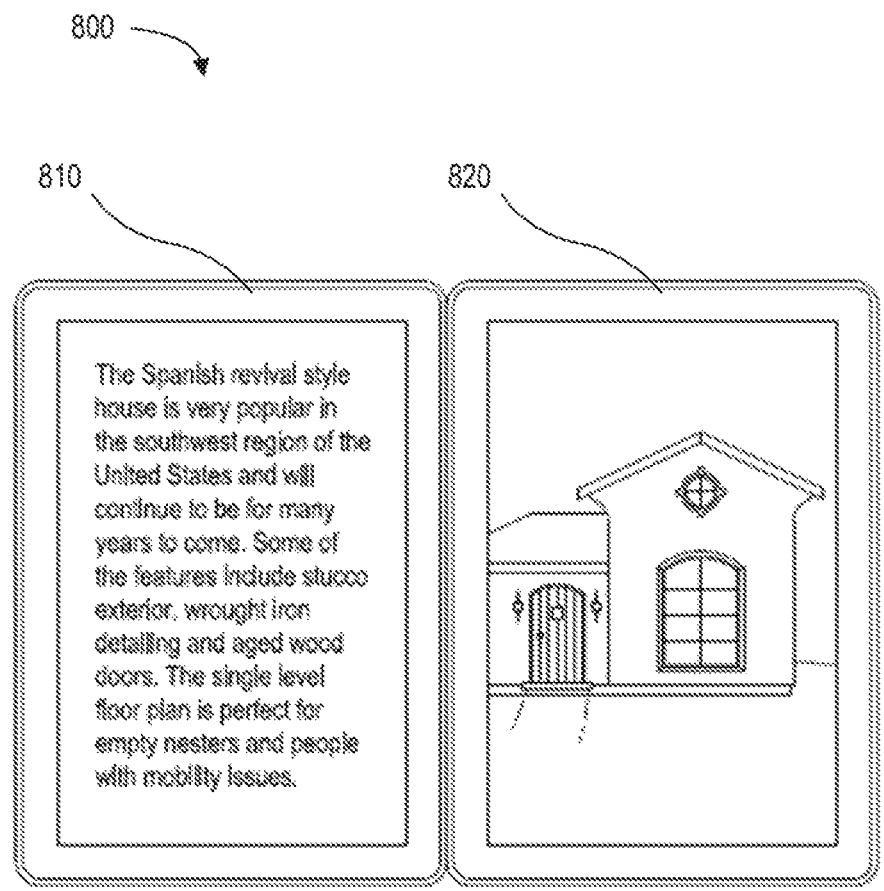
FIG. 8 is a diagram depicting an example multi-device collaborating environment comprising client computing devices that function as an electronic reader.

In some implementations, the first computing device and the second computing device (and/or other computing devices in the multi-device collaboration environment) may function as an electronic book reader when attached and/or connected to one another. An example illustration describing the functionalities of electronic reader engine 125 is shown in FIG. 8.

Figure 9:
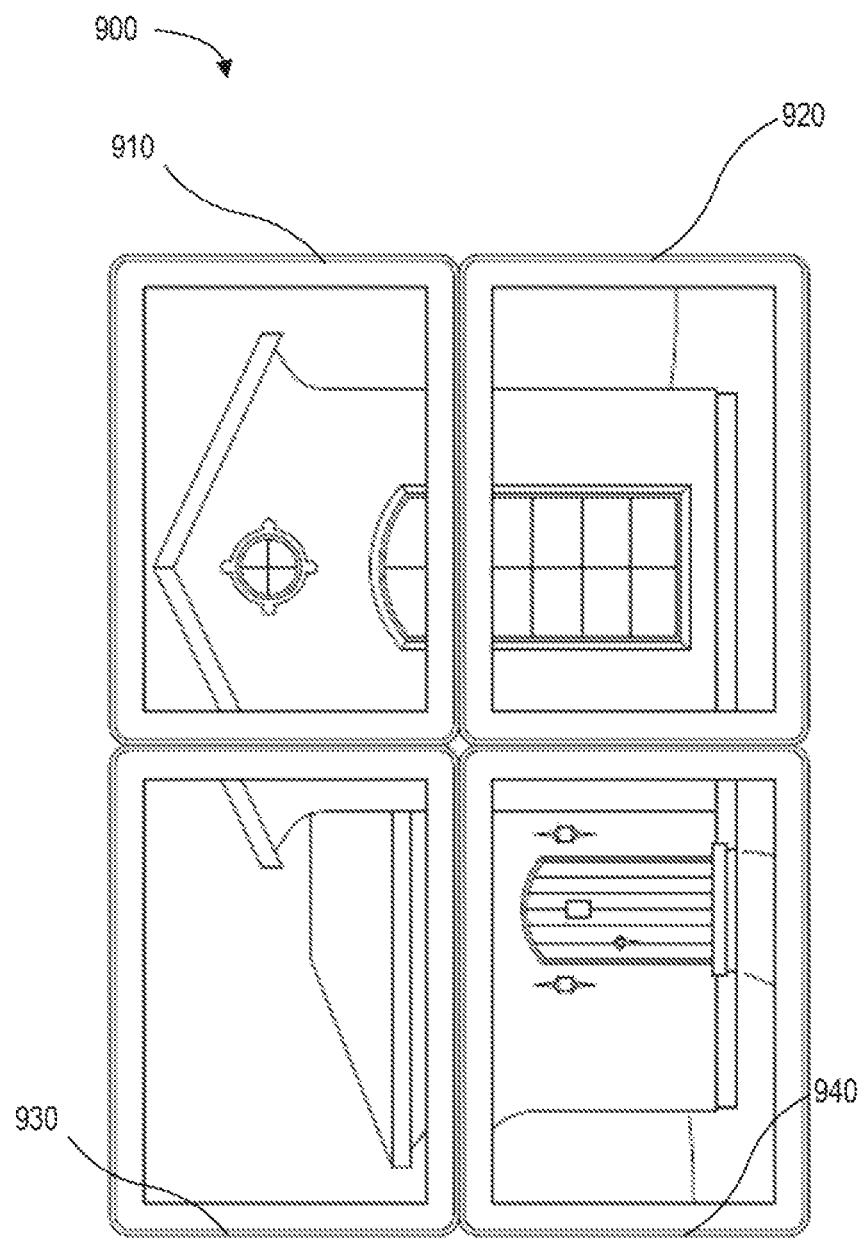
FIG. 9 is a diagram depicting an example multi-device collaborating environment comprising client computing devices that are connected to provide an extended touchscreen space.

Content combining engine 126 may combine various content inputted via different computing devices in the multi-device collaboration environment. For example, the first computing device may comprise a first touch-screen and the second computing device comprise a second touch-screen. Content combining engine 126 may obtain first content inputted via the first touch-screen and second content inputted via the second touch-screen. Content combining engine 125 may then generate third content that combines the first content and the second content. In this way, a user may draw one big picture over multiple touch-screen displays, and content combining engine 126 may capture the entire picture drawn across the multiple displays and/or store the picture. An example illustration describing the functionalities of content combining engine 126 is shown in FIG. 9.

In performing their respective functions, engines 121-126 may access data storage 129. Data storage 129 may represent any memory accessible to engines 121-126 that can be used to store and retrieve data. Data storage 129 may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data.

Data storage 129 may include a database to organize and store data. Database may be, include, or interface to, for example, an Oracle™ relational database sold commercially by Oracle Corporation. Other databases, such as Informix™, DB2 (Database 2) or other data storage, including file-based (e.g., comma or tab separated files), or query formats, platforms, or resources such as OLAP (On Line Analytical Processing), SQL (Structured Query Language), a SAN (storage area network), Microsoft Access™, MySQL, PostgreSQL, HSpace, Apache Cassandra, MongoDB, Apache CouchDB™, or others may also be used, incorporated, or accessed. The database may reside in a single or multiple physical device(s) and in a single or multiple physical location(s). The database may store a plurality of types of data and/or files and associated data or file description, administrative information, or any other data.

Figure 2:
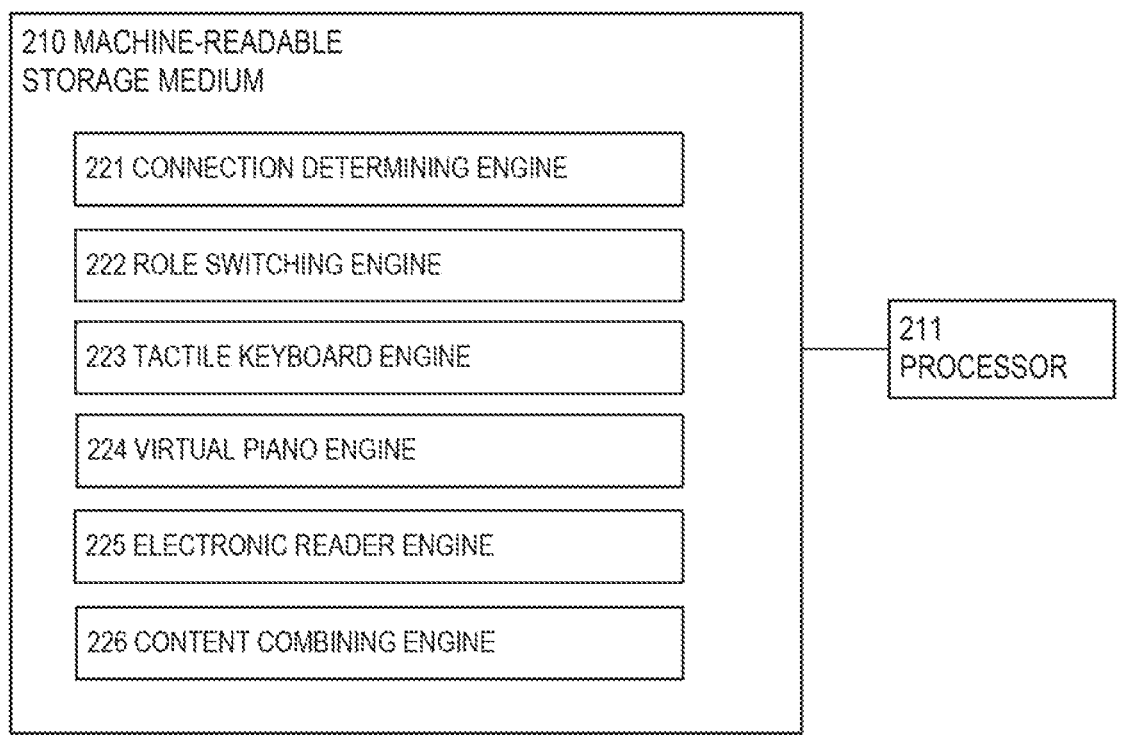
FIG. 2 is a block diagram depicting an example machine-readable storage medium comprising instructions executable by a processor for facilitating multi-device collaboration.

FIG. 2 is a block diagram depicting an example machine-readable storage medium 210 comprising instructions executable by a processor for facilitating multi-device collaboration.

In the foregoing discussion, engines 121-126 were described as combinations of hardware and programming. Engines 121-126 may be implemented in a number of fashions. Referring to FIG. 2, the programming may be processor executable instructions 221-226 stored on a machine-readable storage medium 210 and the hardware may include a processor 211 for executing those instructions. Thus, machine-readable storage medium 210 can be said to store program instructions or code that when executed by processor 211 implements engines 121-126 of FIG. 1.

Machine-readable storage medium 210 may be any electronic, magnetic, optical, or other physical storage device that contains or stores executable instructions. In some implementations, machine-readable storage medium 210 may be a non-transitory storage medium, where the term "non-transitory" does not encompass transitory propagating signals. Machine-readable storage medium 210 may be implemented in a single device or distributed across devices. Likewise, processor 211 may represent any number of processors capable of executing instructions stored by machine-readable storage medium 210. Processor 211 may be integrated in a single device or distributed across devices. Further, machine-readable storage medium 210 may be fully or partially integrated in the same device as processor 211, or it may be separate but accessible to that device and processor 211.

In one example, the program instructions may be part of an installation package that when installed can be executed by processor 211 to implement engines 121-126. In this case, machine-readable storage medium 210 may be a portable medium such as a floppy disk, CD, DVD, or flash drive or a memory maintained by a server from which the installation package can be downloaded and installed. In another example, the program instructions may be part of an application or applications already installed. Here, machine-readable storage medium 210 may include a hard disk, optical disk, tapes, solid state drives, RAM, ROM, EEPROM, or the like.

Processor 211 may be at least one central processing unit (CPU), microprocessor, and/or other hardware device suitable for retrieval and execution of instructions stored in machine-readable storage medium 210. Processor 211 may fetch, decode, and execute program instructions 221-226, and/or other instructions. As an alternative or in addition to retrieving and executing instructions, processor 211 may include at least one electronic circuit comprising a number of electronic components for performing the functionality of at least one of instructions 221-226, and/or other instructions.

In FIG. 2, the executable program instructions in machine-readable storage medium 210 are depicted as a connection determining instructions 221, a role switching instructions 222, a tactile keyboard instructions 223, a virtual piano instructions 224, an electronic reader instructions 225, a content combining instructions 226, and/or other instructions. Instructions 221-226 represent program instructions that, when executed, cause processor 211 to implement engines 121-126, respectively.

Figure 3:
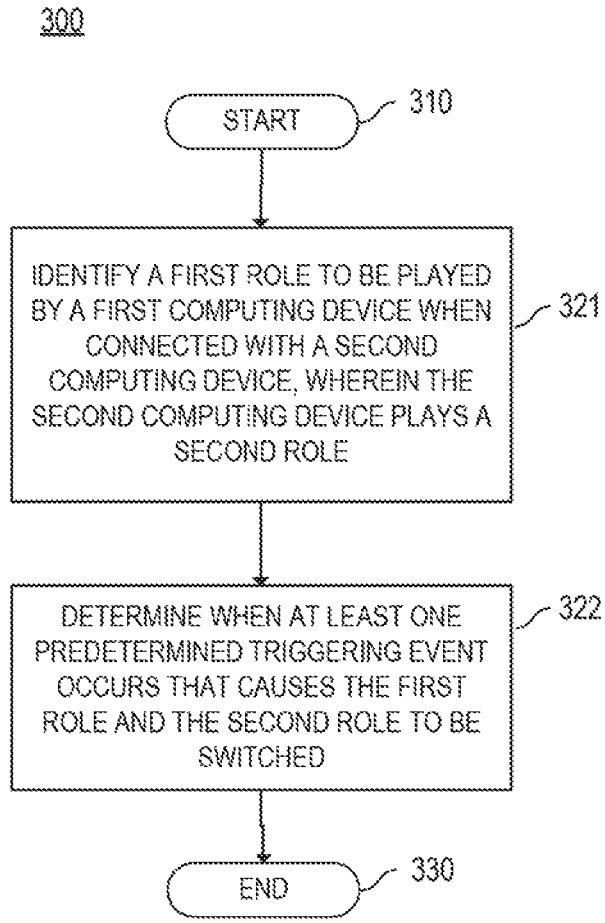
FIG. 3 is a flow diagram depicting an example method for identifying roles for multiple client computing devices that are connected within a multi-device collaborating environment and determining when at least one predetermined triggering event occurs that causes the roles to be switched.

FIG. 3 is a flow diagram depicting an example method 300 for identifying roles for multiple client computing devices that are connected within a multi-device collaborating environment and determining when at least one predetermined triggering event occurs that causes the roles to be switched.

The various processing blocks and/or data flows depicted in FIG. 3 (and in the other drawing figures such as FIG. 4) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 300 as illustrated (and described in greater detail below) is meant to be an example and, as such, should not be viewed as limiting. Method 300 may be implemented in the form of executable instructions stored on a machine-readable storage medium, such as storage medium 210, and/or in the form of electronic circuitry.

Method 300 may start in block 310 and proceed to block 321 where method 300 may identify, by a first computing device, a first role to be played by the first computing device when the first computing device is connected with a second computing device. The second computing device may play a second role when the second computing device is connected with the first computing device. For example, a user of the first computing device may select a role to be played by the first computing device.

In block 322, method 300 may include determining when at least one predetermined triggering event occurs that causes the first role and the second role to be switched such that the first role is played by the second computing device and the second role is played by the first computing device. For example, the first role associated with the first computing device and the second role associated with the second computing device may be switched off based on the occurrence of at least one predetermined triggering event such that the first role is played by the second computing device and the second role is played by the first computing device. The at least one triggering event may comprise a user input, an orientation change (e.g., position change) of at least one of the computing devices in the multi-device collaboration environment, and/or other triggering events. Method 300 may then stop in block 330.

Referring back to FIG. 1, connection determining engine 121 may be responsible for implementing block 321. Role switching engine 122 may be responsible for implementing block 322.

Figure 4:
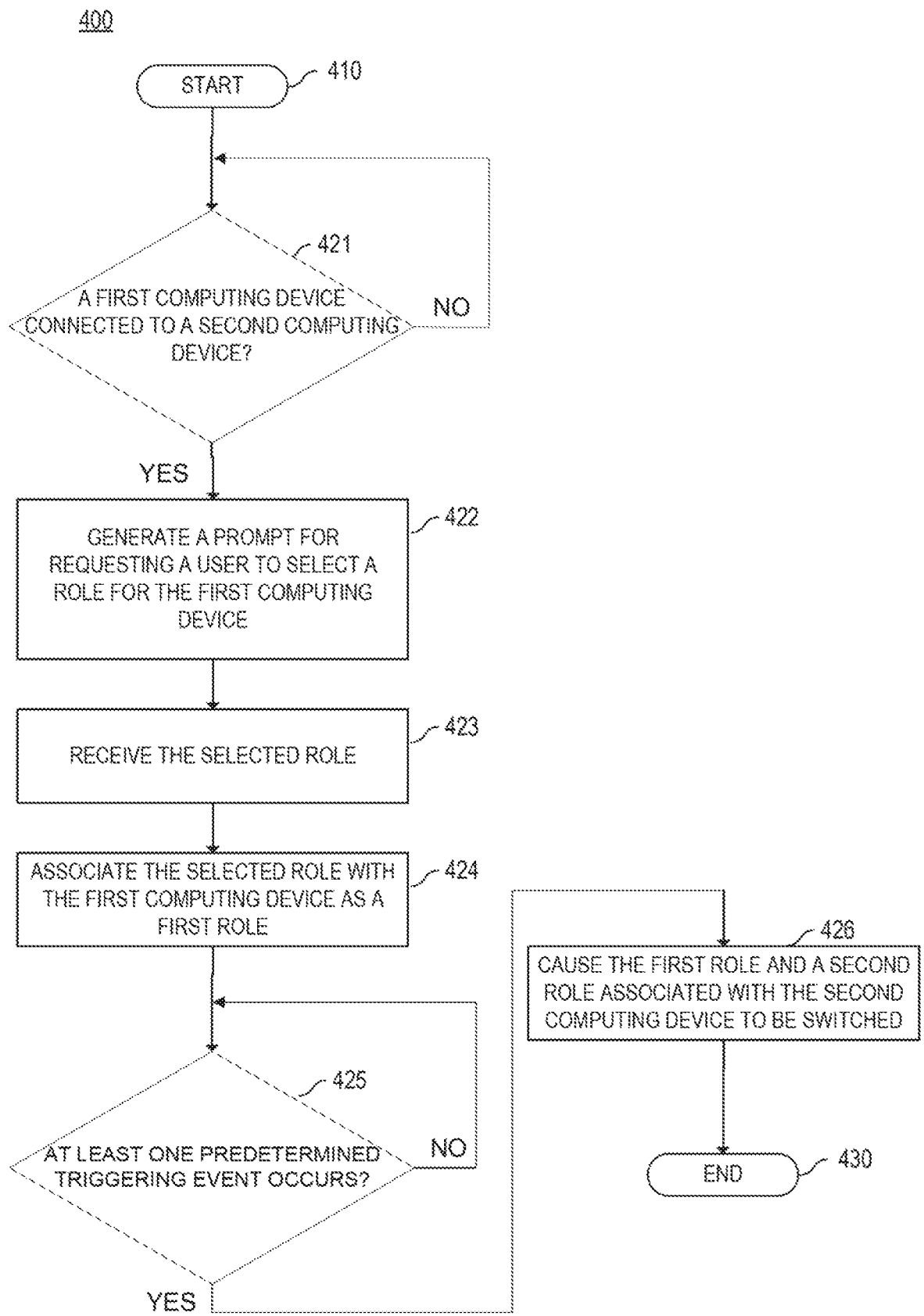
FIG. 4 is a flow diagram depicting an example method for identifying roles for multiple client computing devices that are connected within a multi-device collaborating environment and determining when at least one predetermined triggering event occurs that causes the roles to be switched.

FIG. 4 is a flow diagram depicting an example method 400 for identifying roles for multiple client computing devices that are connected within a multi-device collaborating environment and determining when at least one predetermined triggering event occurs that causes the roles to be switched. Method 400 as illustrated (and described in greater detail below) is meant to be an example and, as such, should not be viewed as limiting. Method 400 may be implemented in the form of executable instructions stored on a machine-readable storage medium, such as storage medium 210, and/or in the form of electronic circuitry.

Method 400 may start in block 410 and proceed to block 421 where method 400 may determine, by a first computing device, when the first computing device is connected to a second computing device. When they are not connected, method 400 may return to block 421. On the other hand, when it is determined that they are connected, method 300 may proceed to block 422.

In block 422, method 400 may generate a prompt for requesting a user to select a role (e.g., a first role) for the first computing device. The prompt may be displayed via a display of the first computing device. The role may be selected from a group of different roles that the first computing device may be capable of playing in a multi-device collaboration environment. For example, the role may comprise at least one of a keyboard, a tactile keyboard, a virtual piano keyboard, a game controller, a drawing pad, a display of content, and/or other roles.

In block 423, method 400 may receive the selected role. The selected role may be associated with the first computing device (block 424). The association between the first role and the first computing device may be stored in data storage 129 coupled to the first computing device and/or coupled to at least one computing device in the multi-device collaboration environment, and/or other databases. In some instances, the user may specify a role (e.g., a second role) for the second computing device using the first computing device. In other instances, the prompt may be generated and provided to a user via the second computing device. The role selected for the second computing device may be associated with the second computing device. The association between the second role and the second computing device may be stored in data storage 129 coupled to the second computing device and/or coupled to at least one computing device in the multi-device collaboration environment, and/or other databases.

In block 425, method 400 may include determining when at least one predetermined triggering event occurs that causes the first role and the second role to be switched such that the first role is played by the second computing device and the second role is played by the first computing device. For example, the first role associated with the first computing device and the second role associated with the second computing device may be switched off based on the occurrence of at least one predetermined triggering event such that the first role is played by the second computing device and the second role is played by the first computing device. The at least one triggering event may comprise a user input, an orientation change (e.g., position change) of at least one of the computing devices in the multi-device collaboration environment, and/or other triggering events.

If method 400 determines that no predetermined triggering event has occurred, method 400 may return to block 425. On the other hand, if at least one predetermined triggering event occurs, method 400 may proceed to block 426 where method 400 may cause the first role and the second role to be switched. For example, the user may be playing the virtual piano using the first computing device that may be placed horizontally on a table by following the music scores displayed via the second computing device that may stand substantially perpendicular to the first computing device. The user may then flip the two devices around such that the second computing device may be placed horizontally on the table and the first computing device may stand substantially perpendicular to the second computing device. In this case, it may be detected the orientation change has occurred. In response to the detected orientation change, method 400 may cause the roles to be switched. For example, based on the detected orientation change, the first computing device may operate in accordance with the second role (e.g., a display of music scores) whereas the second computing device may operate in accordance with the first role (e.g., virtual piano keyboard). Method 400 may then stop in block 430.

Referring back to FIG. 1, connection determining engine 121 may be responsible for implementing blocks 421, 422, 423, and 424. Role switching engine 122 may be responsible for implementing blocks 425 and 426.

Figure 5:
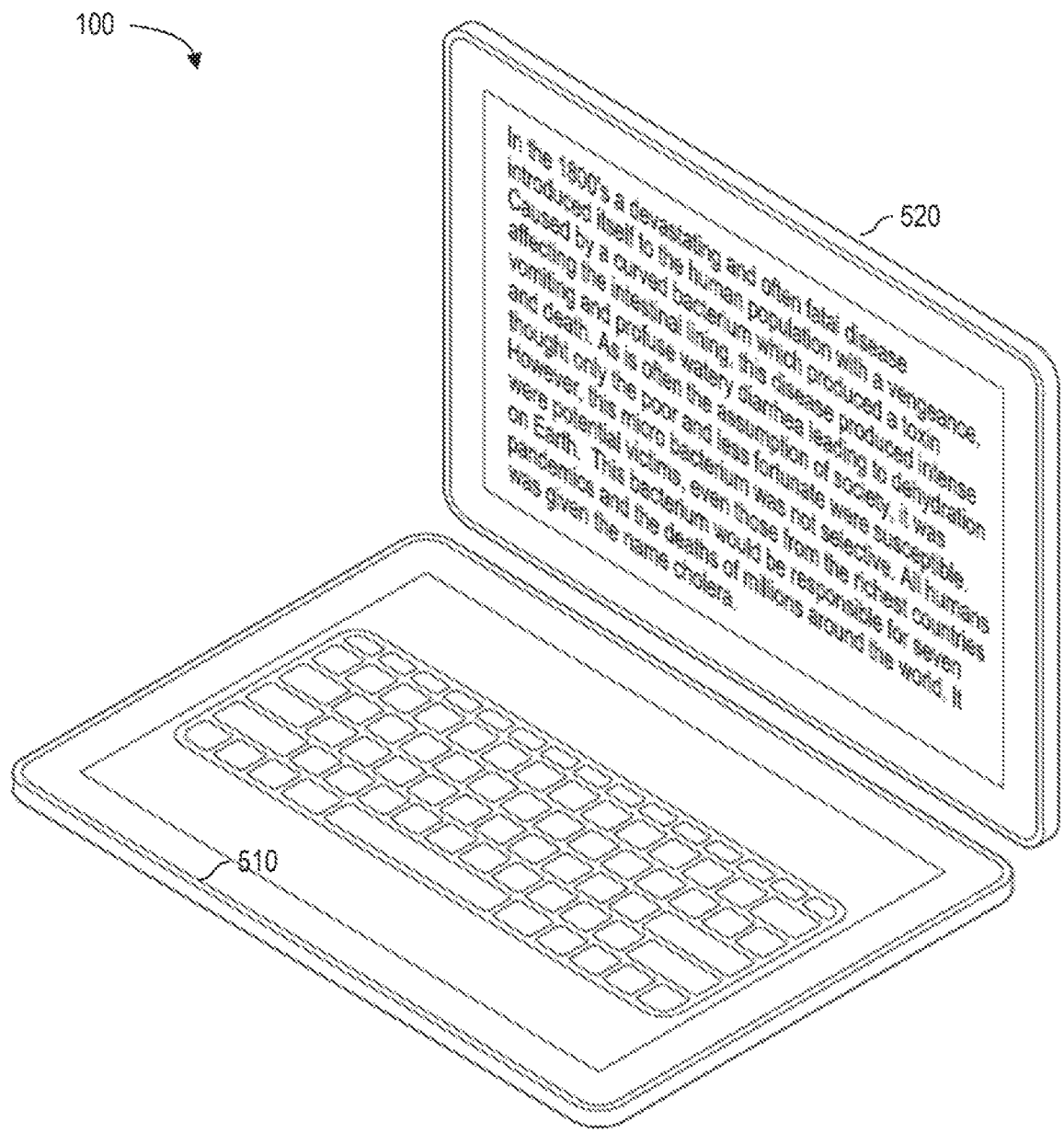
FIG. 5 is a diagram depicting an example multi-device collaborating environment comprising a client computing device that is associated with a keyboard role.

FIG. 5 is a diagram depicting an example multi-device collaborating environment 500 comprising a client computing device that is associated with a keyboard role.

Multi-device collaborating environment 500 may comprise a first computing device 510 and a second computing device 520 that are connected via a connection interface. A first role associated with the first computing device 510 may comprise a keyboard (e.g., including a tactile keyboard as discussed herein). A user may use a touch-screen capability of the first computing device 510 to operate the keyboard. The second computing device 520 may be associated with a second role that may comprise a display of content. For example, the second computing device 520 may function as a display monitor. When the user types a word using the keyboard of the first computing device 510, the word will appear on the display monitor of the second computing device 520. In some implementations, if an orientation change is detected (e.g., the user flips the two devices around), the roles may be switched such that the first computing device 510 may operate in accordance with the second role and the second computing device 520 may operate in accordance with the first role.

FIG. 6 is a diagram depicting an example multi-device collaborating environment 600 comprising a client computing device that is associated with a virtual piano keyboard role.

Multi-device collaborating environment 600 may comprise a first computing device 610 and a second computing device 620 that are connected via a connection interface. A first role associated with the first computing device 510 may comprise a virtual piano keyboard. A user may use a touch-screen capability of the first computing device 610 to operate the virtual piano keyboard. The second computing device 620 may be associated with a second role that may comprise a display of music score. For example, as the user plays the piano using the first computing device 610, the notes that are being played may be highlighted on a display of the second computing device 620. When the user nears the end of the last notes of the music score that is being displayed via the second computing device 620, the next page of the music score may automatically appear on the display (of the second computing device 620). When the user plays an incorrect note on the virtual piano keyboard, the user may receive graphical, audio, and/or tactile feedback via the first computing device 610 such that the user may be aware that the user has played the incorrect note. In some implementations, if an orientation change is detected (e.g., the user flips the two devices around), the roles may be switched such that the first computing device 610 may operate in accordance with the second role and the second computing device 620 may operate in accordance with the first role.

FIG. 7 is a diagram depicting an example multi-device collaborating environment 700 comprising client computing devices that display different portions of a virtual piano keyboard.

Two or more computing devices may display different portions of the virtual piano keyboard. In the example depicted in FIG. 7, the multi-device collaborating environment 700 may comprise a first computing device 710, a second computing device 720, and a third computing device 730 that are connected via at least one connection interface. The first computing device 710 may display a first portion 711 of the virtual piano keyboard, the second computing device 720 may display a second portion 721 of the virtual piano keyboard, and the third computing device 730 may display a third portion 731 of the virtual piano keyboard. In this way, the user may be able to play on a larger size piano keyboard that may be displayed via more than one computing device. Similarly, the music score may be displayed through multiple devices. For example, the first computing device 710 may display a first portion 712 of the music score, the second computing device 720 may display a second portion 722 of the music score, and the third computing device 730 may display a third portion 732 of the music score.

FIG. 8 is a diagram depicting an example multi-device collaborating environment 800 comprising client computing devices that function as an electronic reader.

Multi-device collaborating environment 800 may comprise a first computing device 810 and a second computing device 820 that are connected via a connection interface. First content may be displayed on the first computing device 810 while second content that may be related to at least a portion of the first content on the second computing device 820. The first and second content may comprise text, image, videos, audios, and/or other content. This may, for example, allow users to read text on one screen at the same time that they view related images and/or videos on another screen. In some implementations, the first computing device and the second computing device may function as an electronic book reader when attached and/or connected to one another.

FIG. 9 is a diagram depicting an example multi-device collaborating environment 900 comprising client computing devices that are connected to provide an extended touch-screen space.

Multi-device collaborating environment 900 may comprise a first computing device 910, a second computing device 920, a third computing device 930, and a fourth computing device 940 that are connected via at least one connection interface. At least one of the computing devices in the multi-device collaborating environment 900 may combine various content inputted via different computing devices in the multi-device collaboration environment 900. For example, the first computing device 910 may obtain first content inputted via a touch-screen of the first computing device 910, second content inputted via a touch-screen of the second computing device 920, third content inputted via a touch-screen of the third computing device 930, and fourth content inputted via a touch-screen of the fourth computing device 940. The first computing device 910 may then generate combined content that combines the first, second, third, and fourth content. In this way, a user may draw one big picture over multiple touch-screen displays, and the first computing device 910 may capture the entire picture drawn across the multiple displays and/or store the picture.

The foregoing disclosure describes a number of example implementations for multi-device collaboration. The disclosed examples may include systems, devices, computer-readable storage media, and methods for multi-device collaboration. For purposes of explanation, certain examples are described with reference to the components illustrated in FIGS. 1-2. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 3-4 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for execution by a computing device for multi-device collaboration, the method comprising:
   identifying, by a first computing device having a first processor, a first role, from among multiple possible roles, to be played by the first computing device in response to the first computing device being connected with a second computing device having a second processor, wherein the second computing device plays a second role, different from the first role, when the second computing device is connected with the first computing device, wherein one of the roles is to receive user input from a user and another of the roles is to display information to the same user, wherein the user is a single user who is operating both the first and second computing devices in different roles; and
   determining, by the first computing device, when at least one predetermined triggering event occurs that causes the first role and second role to be switched such that the first role is played by the second computing device and the second role is played by the first computing device.

2. The method of claim 1, wherein the role to receive user input comprises at least one of a tactile keyboard, a piano keyboard, a game controller, and a drawing pad.

3. The method of claim 1, comprising:
   determining, by the first computing device, when the first computing device is connected to the second computing device; and
   in response to determining that the first computing device is connected to the second computing device, generating a prompt for requesting the user to select a role for the first computing device.

4. The method of claim 3, comprising:
   receiving, by the first computing device, the selected role; and
   associating, by the first computing device, the selected role with the first computing device as the first role.

5. The method of claim 1, wherein the at least one predetermined triggering event comprises at least one of an orientation change of the first or second computing device and a user input.

6. The method of claim 1, further comprising generating a prompt to the user to select whether the first computing device should be assigned the first role or the second role.

7. A non-transitory machine-readable storage medium comprising instructions executable by a processor of a first tablet computing device for multi-device collaboration, the non-transitory machine-readable storage medium comprising:
   instructions to generate a user prompt for a user to select a first role to be associated with the first tablet computing device from a group of multiple different roles that the first tablet computing device is capable of performing;
   instructions to associate the first role with the first tablet computing device, wherein the first tablet computing device operates in accordance with the first role when the first tablet computing device is connected with a second tablet computing device, a second role being associated with the second tablet computing device;
   instructions to determine when at least one predetermined triggering event occurs that causes the first role to be switched with the second role that is associated with the second tablet computing device; and
   in response to determining that the at least one predetermined triggering event occurs, instructions to associate the second role with the first tablet computing device, wherein the first tablet computing device operates in accordance with the second role when the first tablet computing device is connected with the second tablet computing device.

8. The non-transitory machine-readable storage medium of claim 7, wherein the first role and the second role comprise a virtual piano keyboard and a display of music score respectively.

9. The non-transitory machine-readable storage medium of claim 8, comprising:
instructions to determine when a user plays an incorrect note on the virtual piano keyboard based on the music score; and
in response to determining that the user played the incorrect note, instructions to provide graphical, audio, or tactile feedback to the user such that the user is aware that the user has played the incorrect note.

10. The non-transitory machine-readable storage medium of claim 7, wherein the first role or the second role comprises a tactile keyboard, the non-transitory machine-readable storage medium comprising:
instructions to protrude at least one of keyboard keys upwardly from the tactile keyboard when the first tablet computing device is connected with the second tablet computing device; and
instructions to recess the at least one of keyboard keys downwardly when the first tablet computing device is disconnected from the second tablet computing device.

11. The non-transitory machine-readable storage medium of claim 7, comprising:
instructions to cause a display of first content on the first tablet computing device;
instructions to, in response to determining that a user has interacted with the first content on the first tablet computing device, determine second content related to at least a portion of the first content; and
instructions to cause the display of the second content on the second tablet computing device.

12. The non-transitory machine readable storage medium of claim 11, further comprising eye-tracking software to determine that the user has interacted with the first content so as to trigger determination of the second content.

13. The non-transitory machine readable storage medium of claim 11, further comprising instructions to accept user highlighting of a portion of the first content as a trigger to determine the second content.

14. The non-transitory machine readable storage medium of claim 7, wherein, when the first tablet computing device is connected to the second table computing device a subsequent time, the first tablet computing device automatically assumes the first role previously indicated by user input in response to the user prompt.

15. The non-transitory machine readable storage medium of claim 7, further comprising instructions to combine user input from the first and second table computing devices into a single image.

16. A system for multi-device collaboration comprising:
a first tablet computing device comprising a first processor that:
executes a first set of tasks associated with a first role of receiving user input from a user when the first tablet computing device is connected to a second tablet computing device; and
a second tablet computing device comprising a second processor that:
executes a second set of tasks associated with a second role of displaying content for the user when the second tablet computing device is connected to the first tablet computing device,
detects an orientation change in at least one of the first tablet computing device and the second tablet computing device, and
executes the first set of tasks instead of the second set of tasks based on the detected orientation change;
wherein the first tablet computing device comprises a first touch-screen and the second tablet computing device comprises a second touch-screen, the first processor that:
obtains first content inputted via the first touch-screen;
in response to determining that the user has interacted with the first content on the first tablet computing device, obtains second content inputted via the second touch-screen; and
generates third content that combines the first content and the second content.

17. The system of claim 16, comprising:
a third tablet computing device comprising a third processor that:
executes a third set of tasks associated with a third role when the third tablet computing device is connected to at least one of the first tablet computing device and the second tablet computing device.

18. The system of claim 17, wherein the first tablet computing device displays a first portion of a virtual piano keyboard, and the third tablet computing device displays an additional portion of the virtual piano keyboard.

19. The system of claim 16, wherein the first tablet computing device and the second tablet computing device when connected to one another function as an electronic book reader.

* * * * *